United States Patent [19]

Downey

[11] Patent Number: 4,461,497

[45] Date of Patent: Jul. 24, 1984

[54] INFORMATION STORAGE DEVICE AND METHOD

[76] Inventor: Charles R. Downey, 429 Cougar, Olympia, Wash. 98503

[21] Appl. No.: 420,132

[22] Filed: Sep. 20, 1982

[51] Int. Cl.³ .................. B42D 15/02; B65D 27/04
[52] U.S. Cl. .................................. 283/65; 229/75
[58] Field of Search .............. 283/48 R, 65, 903; 229/75

[56] References Cited

U.S. PATENT DOCUMENTS

| | | | |
|---|---|---|---|
| 1,548,487 | 8/1925 | Ross | 283/48 R |
| 2,064,749 | 12/1936 | Huber | 283/63 |
| 3,736,006 | 5/1973 | Polsky | 283/903 |
| 4,097,068 | 6/1978 | Garnier | 283/48 R |
| 4,262,939 | 4/1981 | Schoettle, Jr. | 283/65 |

FOREIGN PATENT DOCUMENTS 2082119  5/1980  United Kingdom ............... 283/903

Primary Examiner—E. R. Kazenske
Assistant Examiner—Paul M. Heyrana, Sr.
Attorney, Agent, or Firm—Delbert J. Barnard

[57] ABSTRACT

A front panel (12), a back panel (14) and a center panel (16) define a plurality of parallel slideways (30) between the panels (12, 14). Each of a plurality of users grasp a projecting tab portion (42) of a slide member (40) provided in each slideway (30) and pulls it outwardly until a chosen number from a strip of numbers on the slide member (40) is exposed on the slide member (40) immediately outwardly of the edge of the device. The user then tears off the projecting portion of the slide member (40). The slide member (40) carries an indicator at its opposite end which identifies the selected number on a corresponding strip of number provided inside of the device on a strip (32) of the center panel (16) which is adjacent to the slideway (30) in which such slide member (40) travels. After all of the slide members (40) have been manipulated in this manner, the device is given to a person who desires the information inside the device. Such person opens a flap-like door (20) provided in the front panel (12) to, in that manner, expose the set of selected numbers which have been recorded inside of the device.

6 Claims, 6 Drawing Figures

INFORMATION STORAGE DEVICE AND METHOD

This invention relates to the provision of a quite simple device adapted for storing numerical evaluation input of a plurality of people, and to a method of its use.

No device or method similar to my device and method are known to me.

In basic form, the device comprises a card-like body having a plurality of tabs projecting outwardly from one of its edges. The tabs are end portions of slide members which are slidably received within slideways formed within the card-like body. Each slide member carries a strip of information, such as a numerical sequence of numbers, for example. This information is carried by a portion of the slide member which is initially hidden within the card-like body. In use, a user pulls outwardly on a slide member until an element of indicia he wishes to select is exposed immediately adjacent the edge of the card-like body. Then, he tears off the projecting portion of the slide member. An internal end portion of the slide member carries a pointer which points to the selected indicia element from a strip of the same information which has been duplicated on a surface internally of the card-like body, adjacent the slide member. The card-like body has a flap-like door on its front side which is initially closed and preferably secured in a closed position.

In accordance with the method of the invention, the information contained on the slide members and on the internal surfaces of the card-like body may be a numerical sequence e.g. numbers 1 to 10.

The device is handed by a first person to a second person and the second person is asked to evaluate a characteristic or skill of the first person on a scale of 1 to n by pulling out the first slide member until the evaluation number which the second person selects is exposed immediately adjacent the edge of the device. The second person then tears off the projecting portion of the slide member to, in that manner, record his/her selection inside of the device. The device is then handed to additional people for additional evaluations in the same manner until all of the slide member have been utilized. The device is then returned to the first person who opens the flap-like door and reads the evaluation information stored inside of the device.

Referring to the accompanying drawings, wherein like reference numerals refer to like parts, and FIG. 1 is an elevational view of the edge of the device opposite the projecting tab ends of the slide members, showing the three-ply construction of the embodiment;

In preferred form, the device of the invention comprises a card-like body 10 which may comprise a front panel 12, a rear panel 14, and a center panel 16.

Figure 1:
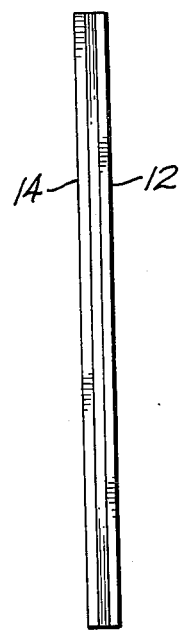
Figure 2:
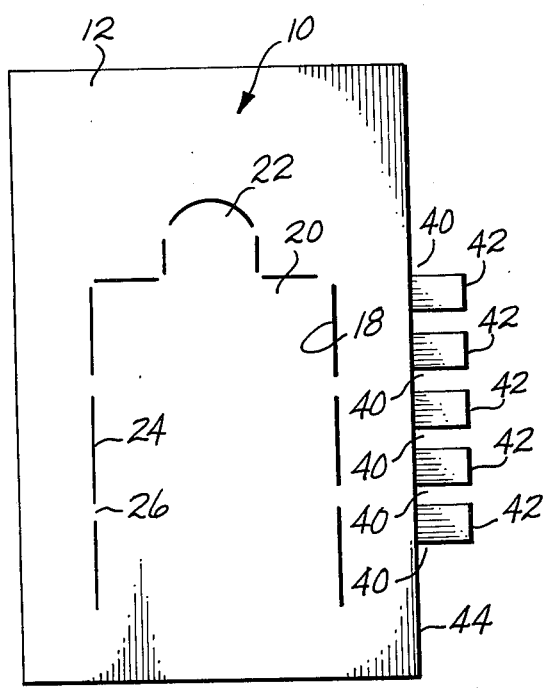
FIG. 2 is a front elevational view of the device prior to use, with the door closed.
Figure 3:
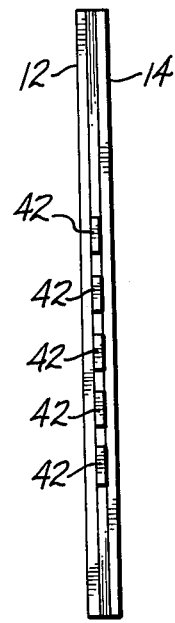
FIG. 3 is an edge elevational view of the edge of the device from which the tab ends of the slide members project.

As shown by FIG. 2, the front panel 12 is formed to include a window opening 18 which is initially closed by a flap-like door 20. Door 20 may include a tab 22 at its end by which it may be grabbed for opening the door 20. Door 20 may be initially secured in a closed position. This can be done in a number of ways. For example, the edges of the door 20 may be formed by making a plurality of slot-like cuts in the material from which front panel 12 is formed, with the cuts 24 being separated by tearable strips.

Figure 6:
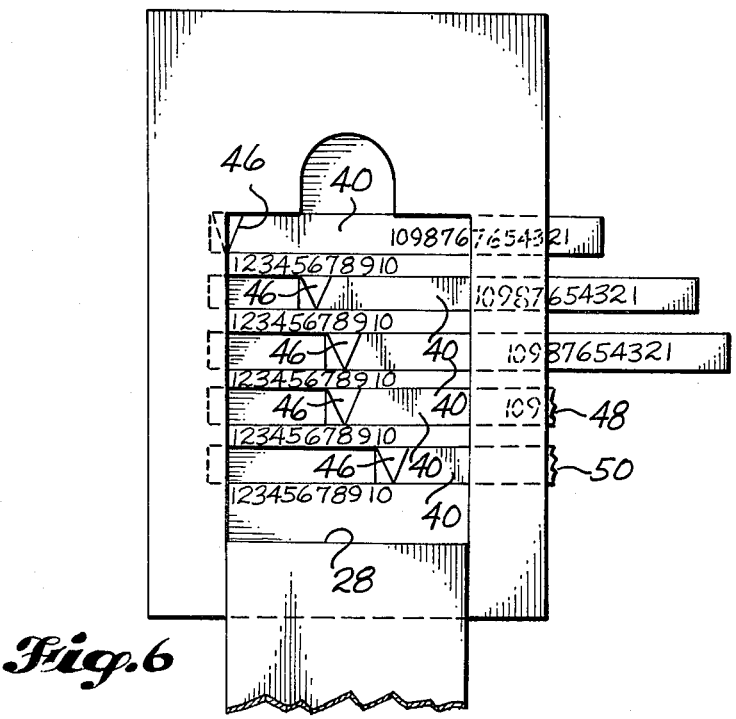
FIG. 6 is a front elevational view of the embodiment showing the door opened and the several slide members in different positions, and an example of the information to be stored, and showing two of the slide members with their outer end portions torn off.

A door secured in this manner may be opened by the user using a fingernail or the like for lifting the end portion of tab 22. Once lifted, the tab 22 is pulled for the purpose of tearing the strips 26 and at the same time pulling the door 20 opening about the hinge connection 28 provided by the uncut end of the door 20 (FIG. 6).

Figure 4:
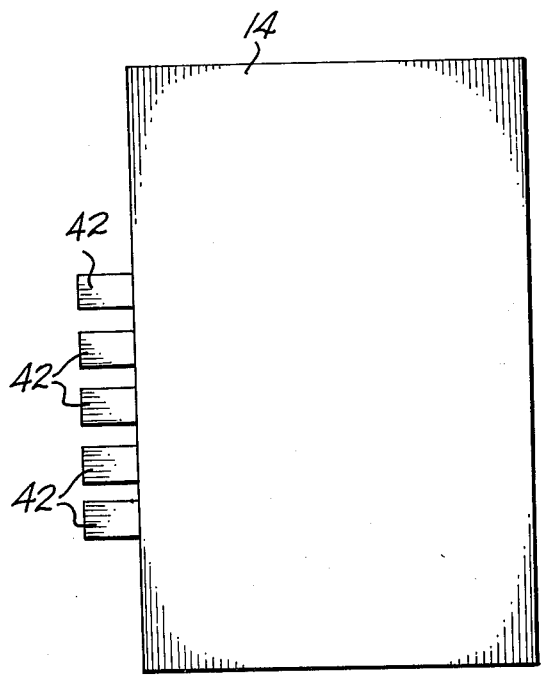
FIG. 4 is an elevational view of the back side of the embodiment.

FIG. 4 shows that the back panel 14 of the preferred embodiment is solid. Instructions and/or other information can be placed on this panel.

Figure 5:
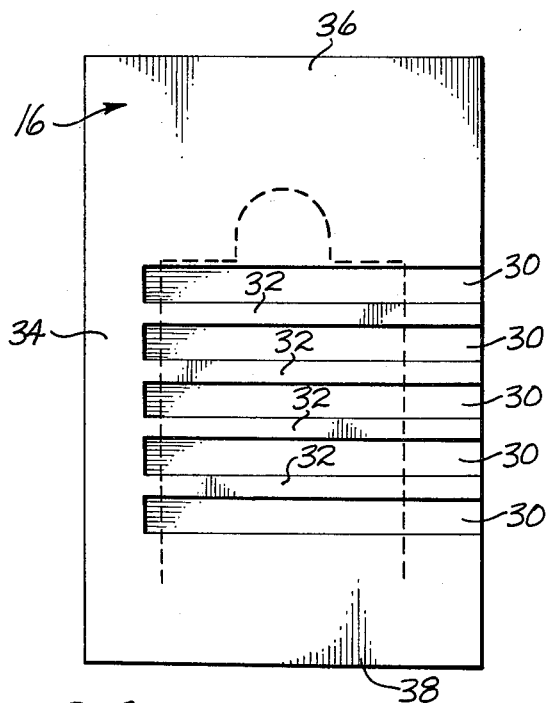
FIG. 5 is a front elevational view of the device with the front panel and the slide members removed.

Referring to FIG. 5, the center panel 16 is formed to include a plurality of parallel cutouts 30. These cutouts extend out to one edge of the body 10 but at their opposite ends end along a common line which is spaced inwardly from the opposite edge of the body 10. Thus, a wide band or strip portion 34 of panel 16 extends along the second edge of the device and interconnects upper and lower end portions 36, 38.

Slideways are defined vertically between the strips 32 and at the ends between the end strips 32 and the end portions 36, 38. The solid back panel 14 forms a solid closure for the slideways.

An elongated slide member 40 is slidably received within each slideway 30. Each slide member 40 includes a tab portion 42 which projects from its slideway 30, endwise outwardly from the edge 44 of body member 10.

As shown by FIG. 6, each slide member 40 is provided with a strip of indicia and an indicator 46. A corresponding strip of indicia is provided on the material strips 32 between the slideways 30. The corresponding indicia may be the same indicia that is on the slide members 40 or may be different indicia having a functional relationship to the indicia on the slide member 40.

In the preferred embodiment, the indicia on both the slide members 40 and the strips 32 are identical and constitute a numerical sequence of 1 to n. Specifically, in the embodiment illustrated, the numerical sequence is 1–10.

An advantageous use of the device is as an evaluator. For example, the device may be used for evaluating a particular characteristic of a person, such as his or her appearance. The illustrated embodiment comprises four slide members 40. Thus, it can be sequentially handed to five different persons who are each asked to evaluate a trait, characteristic or skill of a sixth person, e.g. the appearance of the sixth person. Each is asked to make his or her evaluation on a scale of, for example, 1–10. Each evaluator does this by grasping the projecting tab portion 42 of an unused slide member 40 and pulling outwardly on the slide member 40 until a number corresponding to the evaluation which such person desires to make is exposed on the slide member 40 immediately outwardly of the edge 44. This maneuver results in the indicator 46 at the concealed inner end of the slide member 40 being moved into registry with the selected numeral on the corresponding strip of indicia contained within the device 10. After the evaluation is made, the evaluator tears off the end portion of the slide member 40, to in this manner protect or conceal his or her selection. In FIG. 6 the end portions of the lower two slide members 40 have been removed, as indicated by the severed ends 48, 50.

After an evaluation has been completed by five evaluators, the device is handed to the person being evaluated who opens the door 20 in the manner described above to, in that manner, expose the results of his or her evaluation which had been stored inside of the device 10.

The panels 12, 14, 16 and the slide members 40 may be constructed from the same or a different card stock. The slide members 40 need to be constructed from a material which is tearable, such as cardboard.

As time passes, a large number of additional uses of the device 10 may be discovered. Thus, I do not intend to be limited to any particular use of the device, except for the uses set forth in the claims covering the method aspect of my invention.

What is claimed is:

1. An information storage device comprising a card-like body having a front panel, a rear panel, and means defining a space between said panels and a plurality of parallel slideways in said space, each slideway having an end opening at an edge of the body;
   a plurality of slide members, one positioned in each slideway and each slide member having an end portion projecting outwardly of the edge of the body and from the end of the slideway to provide a pull tab positioned endwise outwardly of the slideway;
   a strip of indicia on each slide member and a related strip of indicia recorded inside of the body adjacent the slideway, and indicator means on each slide member positioned so that when a given slide member is moved to expose a particular element of indicia, immediately outwardly of the edge of the body, adjacent the entrance to the slideway, said indicator is identifying a related element of indicia on the strip of corresponding indicia inside the device identical to said exposed particular element of indicia on said slide member;
   means defining a window opening in the front panel through which the corresponding indicia and the indicator can be viewed; and
   closure means initially closing said window opening.

2. The device of claim 1, wherein said closure means is an integral flap portion of the front panel.

3. The device of claim 2, wherein said front panel has spaced apart cut lines defining three sides of the flap portion and tearable strips between the cut lines initially holding the flap portion in a closed position, and the fourth side of the flap portion remaining a continuous connection of the flap portion to the front panel and serving as a hinge for hinge-connecting the flap portion to the device.

4. The device of claim 1, comprising a plurality of spacer strips sandwiched between the front and rear panels, said spacer strips and said slide members being substantially equal in thickness, with the slideways being defined laterally between the spacer strips.

5. The device of claim 4, comprising a spacer panel sandwiched between the front and rear panels, said spacer panel comprising a plurality of parallel slots extending from one side of the device over to a position spaced inwardly from the opposite edge of the device, said slots constituting the slideways, and said spacer panel including a plurality of parallel strips between the slots, with said corresponding indicia being located on said strips.

6. An evaluation method, comprising:
   providing a card-like body having a front panel, a rear panel, and means defining a space between said panels and a plurality of parallel slideways in said space, each slideway having an end opening at an edge of the body;
   providing a plurality of like slide members, and positioning one in each slideway, with each slide member having an end portion projecting outwardly of the edge of the body and from the end of the slideway, to serve as a pull tab;
   providing a strip of like indicia on each slide member and a corresponding strip in indicia inside of the body adjacent the slideway;
   providing indicator means on the slide member and positioning such indicator means and the two strips of indicia such that when a given slide member is moved to expose a particular element of indicia immediately outwardly of the body, adjacent the entrance to the slideway, said indicator is identifying a relative element of indicia on the strip of corresponding indicia inside of the device identical to said exposed particular element of indicia on said slide member;
   providing a window opening in the front panel of the device through which the corresponding indicia and the indicator can be viewed;
   providing the device with a closure means for initially closing said window opening;
   handing the device to a number of persons equal to the number of slide members;
   asking each person to make a particular evaluation by pulling out a slide member until a number representing that persons evaluation appears immediately outwardly of the edge of the card-like body, and then tearing off the projecting portion of the slide member at the edge of the body, to in that manner conceal the evaluation; and
   delivering the device to a person who will collect the several evaluations, by opening the closure means to expose the positions of the several indictor means inside of the card-like body relative to the strips of information within the body.

* * * * *